(12) United States Patent
Eslambolchi et al.

(10) Patent No.: US 7,315,181 B1
(45) Date of Patent: Jan. 1, 2008

(54) METHOD FOR AUTOMATICALLY IDENTIFYING COMPONENT FAILURE IN A COMMUNICATION NETWORK

(75) Inventors: Hossein Eslambolchi, Santa Clara, CA (US); John McCanuel, Bailey, CO (US); Paritosh Bajpay, Edison, NJ (US); Mihail Vasilescu, Middletown, NJ (US)

(73) Assignee: AT&T Corp., New York, NY (US)

( * ) Notice: Subject to any disclaimer, the term of this patent is extended or adjusted under 35 U.S.C. 154(b) by 68 days.

(21) Appl. No.: 11/290,843

(22) Filed: Dec. 1, 2005

(51) Int. Cl.
*G01R 31/26* (2006.01)

(52) U.S. Cl. .................................................... 324/765
(58) Field of Classification Search ............. None
See application file for complete search history.

(56) References Cited

U.S. PATENT DOCUMENTS

| | | | |
|---|---|---|---|
| 5,581,543 A * | 12/1996 | Natarajan | 714/4 |
| 6,018,806 A * | 1/2000 | Cortopassi et al. | 714/8 |
| 6,075,766 A * | 6/2000 | Croslin | 370/225 |
| 6,311,288 B1* | 10/2001 | Heeren et al. | 714/4 |
| 6,910,167 B2* | 6/2005 | Barton et al. | 714/746 |
| 6,938,190 B2* | 8/2005 | Okuda | 714/55 |
| 2003/0172315 A1* | 9/2003 | Grammel | 714/4 |
| 2005/0041593 A1* | 2/2005 | Kikuchi et al. | 370/242 |
| 2005/0138493 A1* | 6/2005 | Barford | 714/712 |
| 2006/0203714 A1* | 9/2006 | Wessels et al. | 714/1 |

FOREIGN PATENT DOCUMENTS

EP 0538853 A2 * 10/1992

\* cited by examiner

*Primary Examiner*—Jermele Hollington

(57) ABSTRACT

Systems and methods for detecting errors in communication networks are described. When an interface component is potentially defective, a rules engine performs diagnostic testing to determine if the interface component is defective. During diagnostics, the rules engine tests a protection interface card to determine if it is defective before determining if the interface component is defective.

3 Claims, 3 Drawing Sheets

METHOD FOR AUTOMATICALLY IDENTIFYING COMPONENT FAILURE IN A COMMUNICATION NETWORK

BACKGROUND

The present invention relates to communication network management. In particular, but not by way of limitation, the present invention relates to systems and methods for error detection in a communication network.

In the competitive telecommunications industry it is advantageous to identify communication network troubles quickly and get them resolved as soon as possible. This requires quick and reliable error detection and isolation to ensure network integrity and maintain both customer satisfaction and customer loyalty.

In communication networks, it is not uncommon for an interface component (e.g. an interface card) to become defective. Previously known techniques for diagnosing whether an interface component is defective typically perform signal quality monitoring at the interface component. If a degraded signal is monitored, the previously known techniques perform diagnostic testing, which includes disconnecting communication lines connected to the interface component, and bridging the communication lines to a protection interface component.

After the communication lines are bridged, the diagnostic testing determines whether the degraded signal persists at the protection interface component. If the degraded signal does not persist at the protection interface component, then the diagnostic testing confirms that the interface component is defective. Otherwise, if the degraded signal persists at the protection interface component, then the diagnostic testing confirms that the degraded signal is related to a defective component in the network other than the interface component.

The diagnostic testing is problematic because it assumes that the protection interface component is not defective. As discussed above, if the degraded signal persists at the protection interface component, then the diagnostic testing confirms that the degraded signal is related to a defective component in the network other than the interface component. This confirmation would be incorrect if the protection interface component is defective (i.e. if the protection interface component is defective, it will always show a degraded signal).

Accordingly, previously known diagnostic testing is not configured to determine whether the protection interface component is defective. There exists a need for diagnostic testing that determines whether the protection interface component is not defective.

SUMMARY OF THE INVENTION

Embodiments of the present invention include methods and systems for identifying one or more failures in a communication network. In one embodiment, the invention may be characterized as a method for automatically detecting one or more defective interface components. The method includes collecting data from an interface component for a predetermined time period, determining if the data from the interface component meet or exceed a predetermined threshold, and identifying the interface component as defective if the data meet or exceed the predetermined threshold.

Exemplary embodiments of the present invention are more fully described in the Detailed Description section. It is to be understood, however, that there is no intention to limit the invention to the forms described in either this section or in the Detailed Description section of this application. One skilled in the art can recognize that there are numerous modifications, equivalents and alternative constructions that fall within both the spirit and the scope of the invention as expressed in the claims.

BRIEF DESCRIPTION OF THE DRAWINGS

Various advantages and a more complete understanding of the present invention are apparent and more readily appreciated by reference to the following Detailed Description and to the appended claims when taken in conjunction with the accompanying Drawings wherein:

DETAILED DESCRIPTION

The present arrangement described below allows a service provider to detect and isolate troubles in a communication network.

Figure 1:
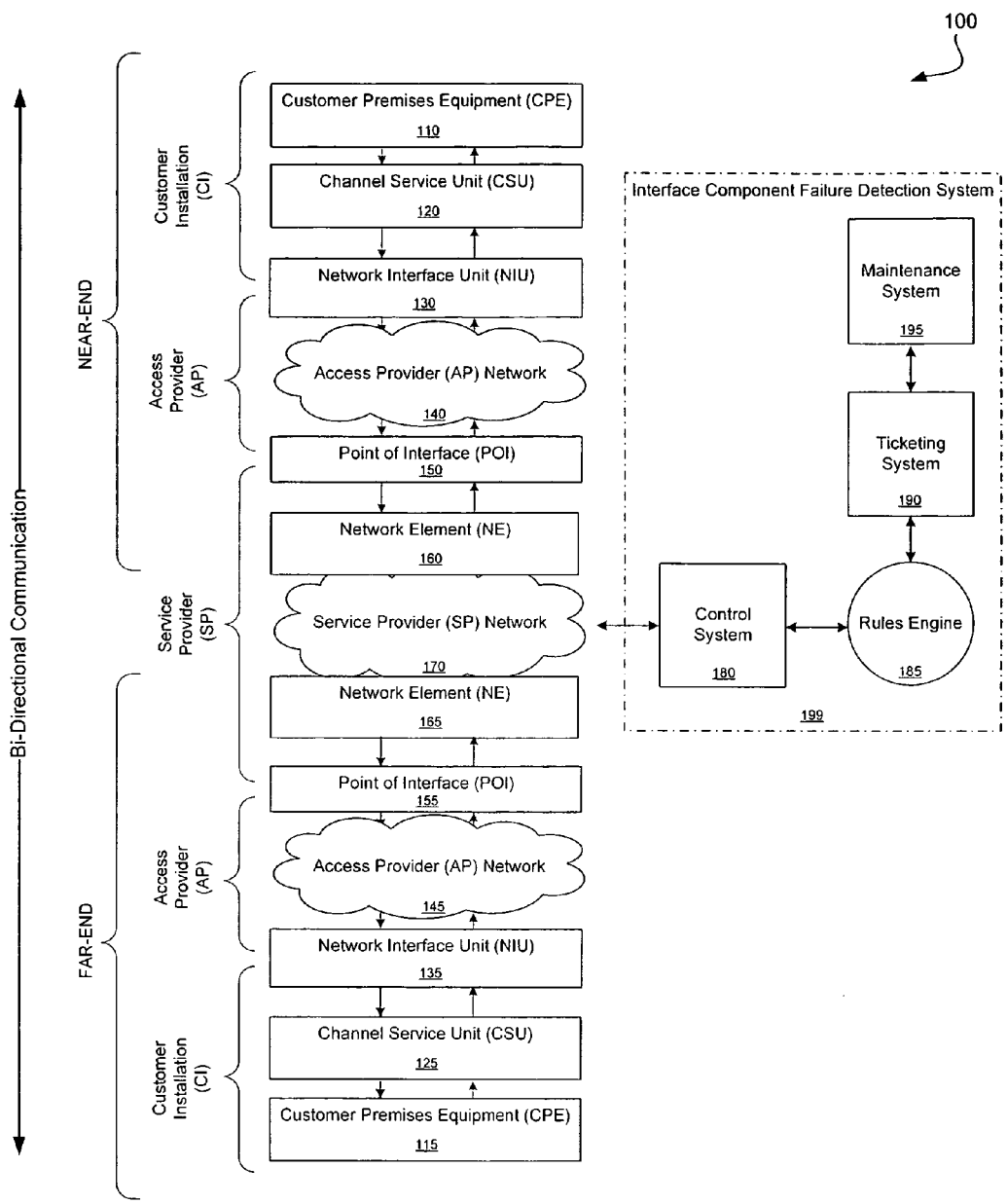
FIG. 1 depicts a block diagram of a communication network in accordance with an exemplary embodiment of the present invention.

FIG. 1 depicts a communication network 100 in accordance with an exemplary embodiment of the present invention. The term "communication network" is used herein to refer to any type of communication network, including a customer-to-customer communication network, a customer-specific communication network, a service provider-specific communication network, an access provider-specific communication network, a customer-to-service provider communication network, a customer-to-access provider communication network, and an access provider-to-service provider communication network, as well as other variations recognizable in the art.

According to FIG. 1, the network 100 includes a near-end environment and a far-end environment. The terms "near-end" and "far-end" are used herein to distinguish between two opposite-ended environments of the network 100 that are communicating with each other. For example only, the near-end environment is comprised of network components that include a customer premises equipment (CPE) 110, a channel service unit (CSU) 120, a network interface unit (NIU) 130, an access provider (AP) network 140, a point of interface (POI) 150 and a network element (NE) 160. The far-end environment is comprised of network components that include a customer premises equipment (CPE) 1115, a channel service unit (CSU) 125, a network interface unit (NIU) 135, an access provider (AP) network 145, a point of interface (POI) 155 and a network element (NE) 165. The network components listed above are linked directly or indirectly using bi-directional communication technology that allows data exchange to and from each component.

As shown in FIG. 1, the network 100 comprises several sub-environments including a near-end customer installation (CI), a near-end access provider (AP), a service provider (SP), a far-end access provider (AP), and a far-end customer installation (CI). Each of these sub-environments are shown to include one or more of the network components listed above.

The service provider sub-environment includes a service provider network 170. In an exemplary embodiment, the service provider sub-environment also includes an interface component failure detection system 199, which comprises a control system 180, a rules engine 185, a ticketing system 190 and a maintenance system 195. One of ordinary skill in the art will recognize alternative embodiments that include the interface component failure detection system 199 in sub-environments other that the service provider sub-environment.

The service provider sub-environment provides a service to one or more customer installation sub-environments. In one embodiment, the service is a telecommunications service, an Internet service, or a combination thereof. One of ordinary skill in the art will appreciate alternative services that are within both the scope and the spirit of the present invention. One of ordinary skill in the art will also appreciate alternative embodiments where the customer installation sub-environments and the service provider sub-environment connect directly to each other.

It should be recognized that the bi-direction communication technology of the network 100 is not limited to any particular type of communication technology. One of ordinary skill in the art can easily adapt the implementations of the present invention to various types of communication networks or communication systems.

While referring to FIG. 2, simultaneous reference will be made to FIG. 1. Attention is now drawn to FIG. 2, which depicts a block diagram 200 of a communication network interface in accordance with an exemplary embodiment of the present invention.

Figure 2:
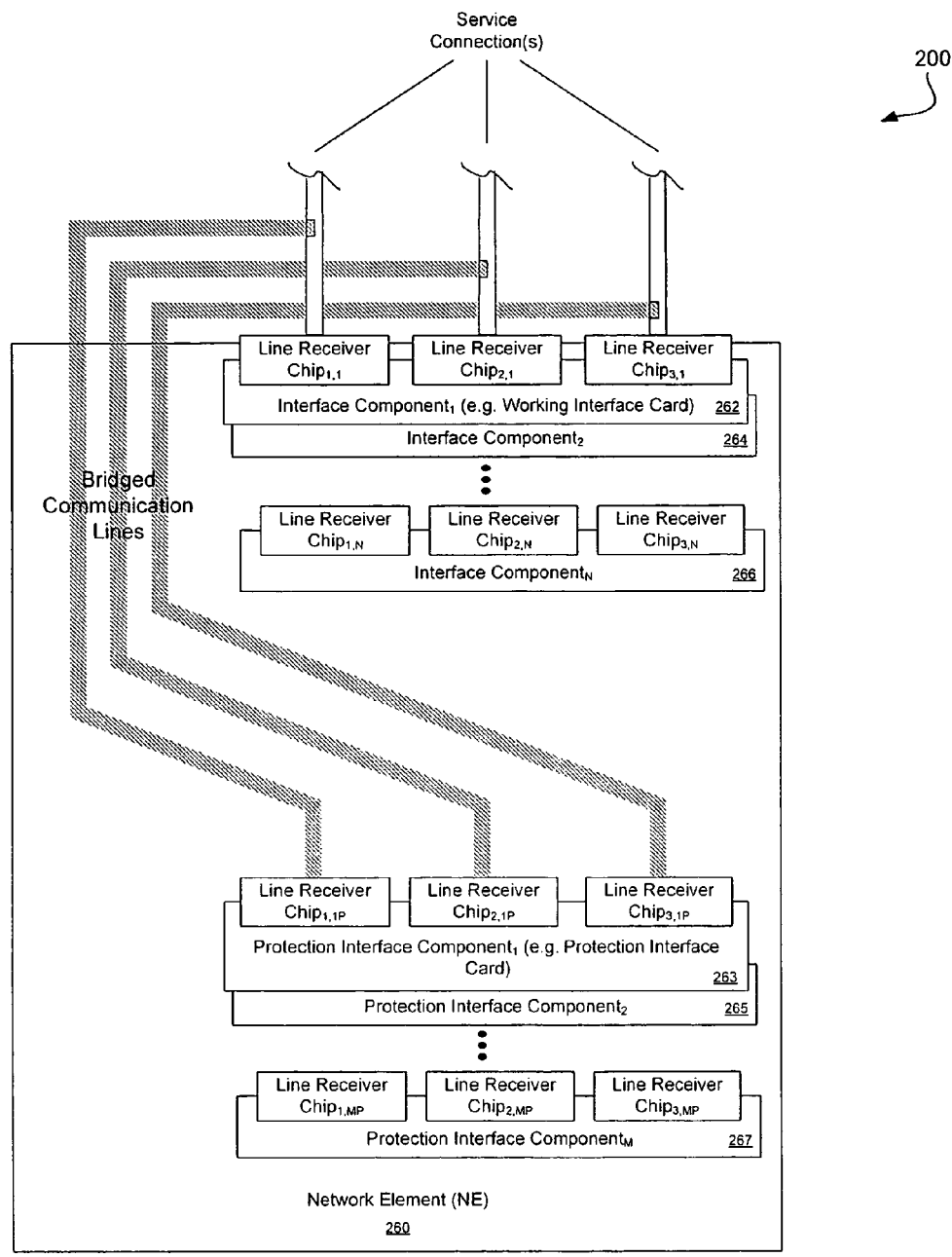
FIG. 2 depicts a block diagram of a communication network interface in accordance with an exemplary embodiment of the present invention.

As shown in FIG. 2, a network element 260 (e.g., the NE 160) comprises N interface components and M protection interface components. The total number of interface components may be set to any value starting at one. The total number of protection interface components may be set to any value starting at one.

According to FIG. 2, N interface components include a first interface component 262, a second interface component 264 and a Nth interface component 266, and M interface components include a first protection interface component 263, a second protection interface component 265 and a Mth protection interface component 267. In an exemplary embodiment, the N interface components are working LAA2B cards and the M protection interface components are protection LAA2B cards. One of ordinary skill in the art will appreciate alternative interface components that are within both the scope and the spirit of the present invention.

Each interface component and protection interface component comprises three line receiver chips. Each line receiver chip is connected to a particular communication line (e.g., a DS3 line). One of ordinary skill in the art will appreciate various communication lines that are consistent with both the scope and the spirit of the present invention.

A protection interface component (e.g., the protection interface component 263) is used when a degraded signal is detected at an line receiver chip of an interface component (e.g., the interface component 262). If a degraded signal is detected, the service connection of the interface component 262 is bridged to the protection interface component 263 while diagnostic testing is performed to determine whether the degraded signal is a product of the interface component 262 or another component in the network 100.

The diagnostic testing first determines whether the protection interface component 263 is defective. This process is described in more detail with respect to FIG. 3 below. If the protection interface component 263 is not defective, then the diagnostics testing continues by determining whether the degraded signal persists at the protection interface component 263. If the degraded signal does not persist at the protection interface component 263, then the diagnostic testing confirms that the interface component 262 is defective. Otherwise, if the degraded signal persists at the protection interface component 263, then the diagnostic testing confirms that the degraded signal is a product of another component of the network 100 other than the interface component 262.

While referring to FIG. 3, simultaneous reference will be made to FIG. 1 and FIG. 2. Attention is now drawn to FIG. 3, which illustrates a process flow diagram 300 representative of operation of an exemplary embodiment of the present invention.

Figure 3:
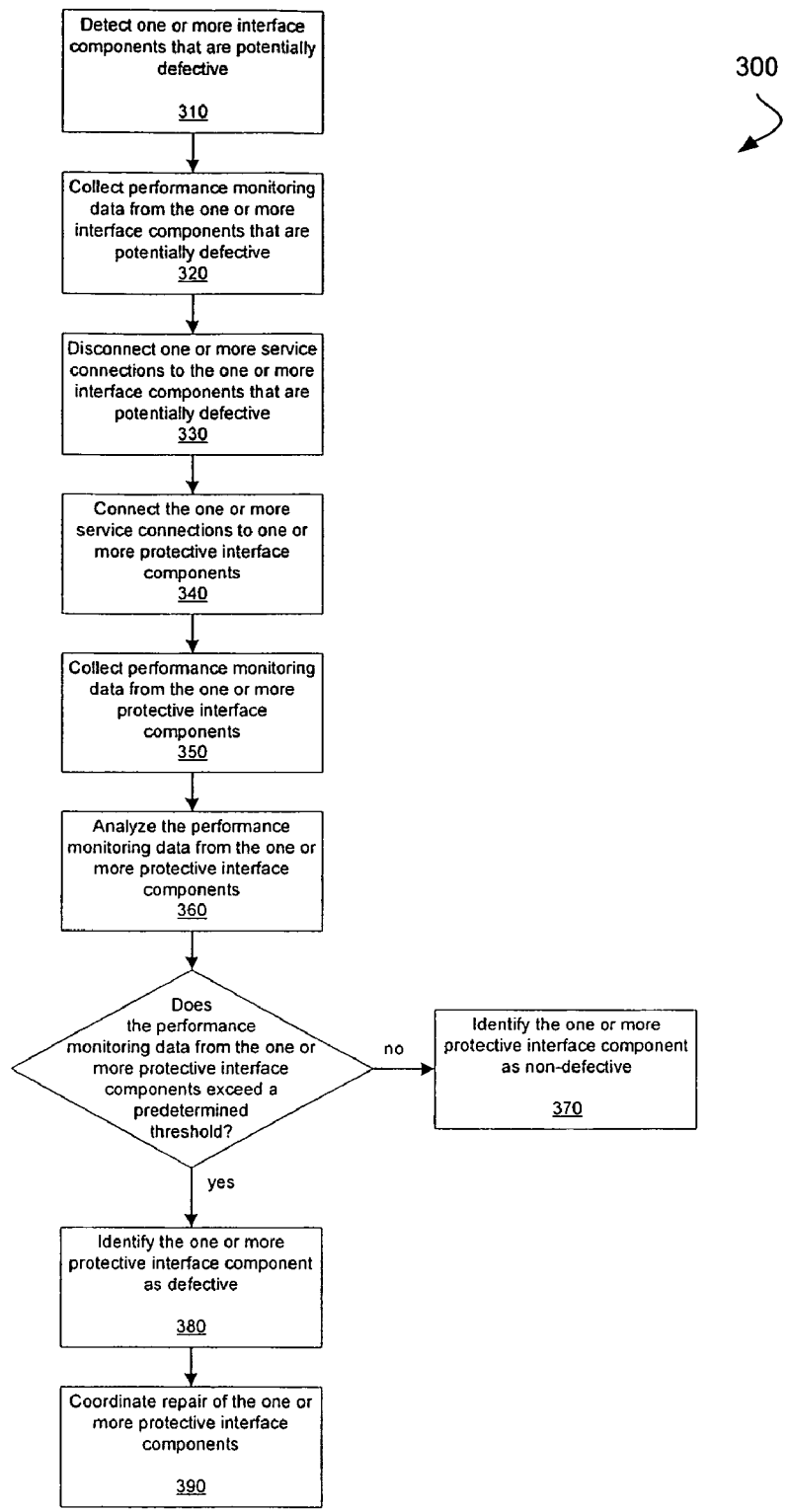
FIG. 3 illustrates a process flow diagram representative of operation of an exemplary embodiment of the present invention.

According to FIG. 3, one or more potentially defective interface components are detected (Block 310). In an exemplary embodiment, a potentially defective interface component is identified by the control system 180 as having an idle signal.

After delivering a list of potentially defective interface components to the rules engine 185, the control system 180 collects data from the listed interface components on an individual basis (Block 320). For example only, the control system 180 collects data from any or all of the line receiver chips in the interface component 262 for a predetermined time period. The data may be performance monitoring (PM) data, including performance report messages, network performance report messages, far end block errors, errored seconds, severely errored seconds, control source slips, unavailable seconds, bursty errored seconds, severely errored framing seconds, line errored seconds, degraded minutes and/or other PM data known in the art.

After the control system 180 collects data from the interface component 262, the rules engine 185 sends a command to the network element 260 that instructs the network element 260 to disconnect the service connections that are connected to the interface component 262 (Block 330). The rules engine 185 also instructs the network element 260 to connect the service connections to a protection interface component (e.g. the protection interface component 263) (Block 340).

The control system 180 then collects data from any or all of the line receiver chips in the protection interface component 263 (Block 350). In an exemplary embodiment, the data, which may be performance monitoring (PM) data, is collected for a predetermined time period and then analyzed (Block 360). If the PM data does not meet or exceed a predetermined threshold, then the protection interface component is identified as a non-defective protection interface component (Block 370). Otherwise, if the PM data meet or exceed the predetermined threshold, then the protection interface component is identified as a defective protection interface component (Block 380). The predetermined threshold is determined based on non-zero PM data collected during the predetermined time period.

If the PM data meet or exceed the predetermined threshold, the rules engine 185 coordinates repair (Block 390). Repair coordination may include notifying the ticketing system 190, which creates a ticket that notifies the maintenance system 195 of the defective protection interface component. The maintenance system 195 (e.g. a work center, work station, or on-site technician) then schedules repair or replacement of the defective protection interface component.

Thus the present invention applies a defect detection process that is useful for isolating a defective interface component and then uses the same and similar process to monitor a substitute component, sometimes referred to as a protection component. This reduces the likelihood that a failed component is replaced by a second failed component.

In conclusion, the present invention provides, among other things, systems and methods for detecting errors in a communication network. Those skilled in the art can readily recognize that numerous variations and substitutions may be made in the present invention, its use and its configuration to achieve substantially the same results as achieved by the embodiments described herein. Accordingly, there is no intention to limit the invention to the disclosed exemplary forms. Many variations, modifications and alternative constructions fall within both the scope and the spirit of the disclosed invention as expressed in the claims.

What is claimed is:

1. A method for automatically detecting one or more defective interface components, comprising:
    detecting a first interface component that is potentially defective;
    analyzing whether a second interface component is defective, wherein the second interface component is a protection LAA2B card, wherein the analyzing comprises:
        collecting data from the second interface component selectable as a replacement for the first interface component for a first predetermined time period;
        determining if the data from the second interface component meet or exceed a predetermined threshold; and
        identifying the second interface component as defective if the data meet or exceed the predetermined threshold;
    disconnecting at least one service connection that is connected to the first interface component and connecting the at least one service connection to the second interface component, only if said second interface component is determined to be not defective; and
    collecting data from the second interface component for a second predetermined time period for determining whether said first interface component is defective.

2. A method for automatically detecting one or more defective interface components, comprising
    detecting a first interface component that is potentially defective, wherein the first interface component is a working LAA2B card;
    analyzing whether a second interface component is defective, wherein the analyzing comprises:
        collecting data from the second interface component selectable as a replacement for the first interface component for a first predetermined time period;
        determining if the data from the second interface component meet or exceed redetermined threshold; and
        identifying the second interface component as defective if the data meet or exceed the predetermined threshold;
    disconnecting at least one service connection that is connected to the first interface component and connecting the at least one service connection to the second interface component, only if said second interface component is determined to be not defective; and
    collecting data from the second interface component for a second predetermined time period for determining whether said first interface component is defective.

3. A method for automatically detecting one or more defective interface components, comprising:
    detecting a first interface component that is potentially defective;
    analyzing whether a second interface component is defective, wherein the analyzing comprises:
        collecting data from the second interface component selectable as a replacement for the first interface component for a first predetermined time period;
        determining if the data from the second interface component meet or exceed a predetermined threshold; and
        identifying the second interface component as defective if the data meet or exceed the predetermined threshold;
    disconnecting at least one service connection that is connected to the first interface component and connecting the at least one service connection to the second interface component, only if said second interface component is determined to be not defective, wherein the at least one service connection is at least one DS3 line; and
    collecting data from the second interface component for a second predetermined time period for determining whether said first interface component is defective.

* * * * *